US011268714B2

(12) United States Patent
Johnson

(10) Patent No.: US 11,268,714 B2
(45) Date of Patent: Mar. 8, 2022

(54) SYSTEM AND METHOD FOR CONTROLLING BUILDING FLUID DISTRIBUTION

(71) Applicant: Siemens Industry, Inc., Alpharetta, GA (US)

(72) Inventor: Mark David Johnson, Northglenn, CO (US)

(73) Assignee: Siemens Industry, Inc., Alpharetta, GA (US)

( * ) Notice: Subject to any disclaimer, the term of this patent is extended or adjusted under 35 U.S.C. 154(b) by 89 days.

(21) Appl. No.: 16/641,232

(22) PCT Filed: Aug. 24, 2017

(86) PCT No.: PCT/US2017/048310
§ 371 (c)(1),
(2) Date: Feb. 22, 2020

(87) PCT Pub. No.: WO2019/040067
PCT Pub. Date: Feb. 28, 2019

(65) Prior Publication Data
US 2020/0224903 A1 Jul. 16, 2020

(51) Int. Cl.
*F24F 11/30* (2018.01)
*F24F 11/77* (2018.01)
(Continued)

(52) U.S. Cl.
CPC ............. *F24F 11/30* (2018.01); *F24F 11/54* (2018.01); *F24F 11/56* (2018.01); *F24F 11/64* (2018.01);
(Continued)

(58) Field of Classification Search
CPC .. F24F 11/30; F24F 11/49; F24F 11/54; F24F 11/56; F24F 11/64; F24F 11/74;
(Continued)

(56) References Cited

U.S. PATENT DOCUMENTS 3,685,355 A * 8/1972 DeBaun ................... G01F 1/36
73/861.66
4,995,307 A * 2/1991 Floyd ...................... F24F 3/044
454/299
(Continued)

FOREIGN PATENT DOCUMENTS

| EP | 0721088 A1 | 7/1996 |
|---|---|---|
| JP | H09 282007 A | 10/1997 |
| WO | PCT/FI02/066903 A1 | 8/2002 |

OTHER PUBLICATIONS

PCT Search Report dated Apr. 25, 2018, for PCT Application No. PCT/US2017/048310, 10 pages.

*Primary Examiner* — Kidest Bahta

(57) ABSTRACT

A system and method is provided for controlling building fluid distribution. The system may cause a variable air volume building ventilation system to operate at different combinations of different fan speeds for different damper opening configurations. For each different combination of fan speed and damper opening configuration, the system may: determine a static pressure measurement for each terminal unit based on a flow measurement determined by terminal box controllers using a pressure sensor; and determine a static pressure measurement for the supply fan from a pressure sensor mounted in a ventilation duct downstream of the at least one supply fan and upstream of each terminal unit. The system may also determine and store in each terminal box controller, a friction loss coefficient based on the static pressure measurements for the supply fan and the terminal units.

15 Claims, 4 Drawing Sheets

(51) Int. Cl.
  *F24F 11/74* (2018.01)
  *F24F 11/64* (2018.01)
  *F24F 11/56* (2018.01)
  *F24F 11/54* (2018.01)
  *G05B 19/042* (2006.01)
  *F24F 140/40* (2018.01)
  *F24F 110/40* (2018.01)
  *F24F 140/10* (2018.01)

(52) U.S. Cl.
  CPC .............. *F24F 11/74* (2018.01); *F24F 11/77* (2018.01); *G05B 19/042* (2013.01); *F24F 2110/40* (2018.01); *F24F 2140/10* (2018.01); *F24F 2140/40* (2018.01); *G05B 2219/2614* (2013.01)

(58) Field of Classification Search
  CPC .... F24F 11/77; F24F 2110/40; F24F 2140/10; F24F 2140/40; G05B 19/042; G05B 2219/2614; G05B 2219/2642; Y02B 30/70
  See application file for complete search history.

(56) References Cited

U.S. PATENT DOCUMENTS

| | | | |
|---|---|---|---|
| 5,540,619 A * | 7/1996 | Ahmed | G05D 7/0688 454/256 |
| 8,483,883 B1 | 7/2013 | Watson | |
| 2003/0064676 A1 * | 4/2003 | Federspiel | B61D 27/00 454/75 |

* cited by examiner

SYSTEM AND METHOD FOR CONTROLLING BUILDING FLUID DISTRIBUTION

RELATED APPLICATION

This patent document claims priority under 35 U.S.C. § 119 and all other benefits from PCT Application No. PCT/US2018/027882, titled "System and Method For Controlling Building Fluid Distribution," filed Apr. 17, 2018, the content of which is hereby incorporated by reference to the extent permitted by law.

TECHNICAL FIELD

The present disclosure is directed, in general, to control systems for building systems such as environmental systems and, more particularly, to systems for developing operational parameters for control of fluid distribution systems in buildings.

BACKGROUND

Control systems for building systems may be used to regulate temperature and flow of air through a building. Such systems may benefit from improvements.

SUMMARY

Variously disclosed embodiments include data processing systems and methods that may be used to facilitate controlling building fluid distribution. In one example, a system may comprise at least one processor configured via executable instructions included in at least one memory to cause a variable air volume (VAV) building ventilation system to operate at different combinations of a plurality of different fan speeds for at least one supply fan for a plurality of different damper opening configurations of a plurality of dampers that are controlled by a plurality of respective terminal box controllers and that are included in terminal units positioned at a plurality of ventilation duct branches.

For each different combination of fan speed and damper opening configuration, the at least one processor may be configured to determine a static pressure measurement for each terminal unit based at least in part on at least one flow measurement determined by each terminal box controller using a pressure sensor. In addition, for each different combination of fan speed and damper opening configuration, the at least one processor may be configured to determine a static pressure measurement for the supply fan from a pressure sensor mounted in a ventilation duct downstream of the at least one supply fan and upstream of each of the terminal units.

In addition, the at least one processor may be configured to determine for each terminal box controller, at least one friction loss coefficient based on the static pressure measurements for the supply fan and for the terminal units. Further, the at least one processor may be configured to store the respective determined at least one friction loss coefficient in a memory in each respective terminal box controller for use by each respective terminal box controller in controlling the dampers.

In another example, a method for controlling building fluid distribution may comprise acts carried out through operation of at least one processor that correspond to the functions for which the previously described at least one processor is configured to carry out.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
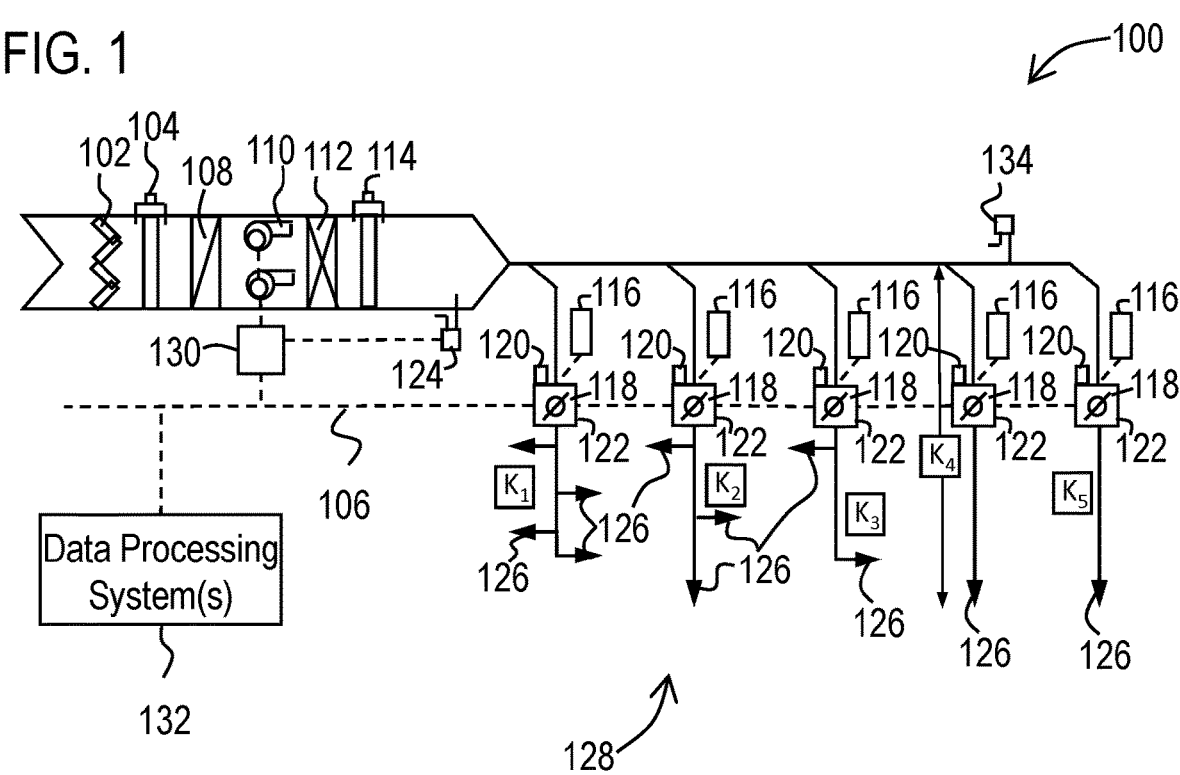
FIG. 1 illustrates a functional block diagram of an example variable air volume building ventilation system.

Various technologies that pertain to systems and methods that facilitate controlling building fluid distribution will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Most commercial properties include a number of building systems that monitor and regulate various functions of the building for the comfort and well-being of the tenants. These building systems include security systems, fire control systems, and elevator systems. One prevalent building system is the environmental control system.

An environmental control system is used to regulate the temperature and flow of air throughout a building. The air conditioning for a building typically includes one or more chillers for cooling air and one or more heaters for warming air. Fans distribute air conditioned by a chiller or heater into a duct system that directs the flow of air to the various rooms of a building. Controllable dampers may be located within the duct system to variably control an opening to a branch of a duct system or to a room. The dampers are maneuvered through a range of movement from being 100% open to 0% open, i.e., closed, by actuators. Also, the speed of a motor that drives a fan is controlled to regulate fan speed and, correspondingly, air flow in the system. Another component of a building environmental system is the control system that varies the fan motor speed and the position of the various dampers to maintain pressure and flow rate set points for the system.

Control systems for building systems may be reliant upon computer and network technology. Micro-controllers and the like may be used to operate and maintain actuators for damper position as well as controlling fan speed. These local controllers provide operational data to an overall system controller. The overall system controller is typically a computer that analyzes data received from local controllers to determine whether system parameters, such as set points, are being maintained. If the system parameters are not being met, the system controller issues command messages to one or more local controllers to adjust local control so the system parameters may be achieved. In some systems, the system controller communicates with the local controllers over a computer network. For example, the hardware platform for the network may be an Ethernet platform and the network software supporting communication over the network may be a TCP/IP layer. This structure supports communication between a control application program executing on the system controller and an application program executing on the local controller.

In order to monitor a building system, a system controller typically receives status data from sensors, such as pressure sensors, coupled to local controllers. These data may be compared by the system controller to the system parameters or set points to determine the control actions required to bring the system into compliance with the system set points. One type of environmental system is a variable air volume (VAV) building ventilation system. FIG. 1 illustrates an example of such a building ventilation system 100.

Outside air may be drawn into the system 100 through an outside damper 102, filtered through a filter 104, and warmed, if necessary, by a heating coil 108. A single or dual fan 110 may be configured to push the air through a cooling coil 112 for cooling, if required, and filtered again by a filter 114 before being supplied to a plurality of ventilation duct branches 128 for distribution through diffusers 126 to zones serviced by the different duct branches. Such branches typically supply air at a constant temperature of 15 degrees Celsius for cooling and 22 degrees Celsius for heating. These values may vary based on the thermal requirements of the space. In addition, such branches may include terminal units 122 (also referred to as VAV boxes) including electronically controlled dampers 118 that control the amount of air flow through the ventilation duct branches. Each terminal unit may have a terminal box controller 116 that controls each respective damper 118.

A fan controller 130 for the supply fan(s) 110 regulates the speed of the supply fan to generate adequate pressure to overcome the resistance provided by the coils, filters, air ducts, dampers, terminal units, and diffusers. Typically, the pressure set point used by the fan controller to regulate the fan speed corresponds to an arbitrary location that is generally two-thirds of the distance to the terminal unit 122 that is farthest downstream from the fan. This pressure may be sensed by a static pressure sensor 134. The pressure sensed at this location varies as the flows to the various zones change in response to thermal requirements detected for a zone. The fan controller 130 uses the sensed static pressure to either modulate the fan speed or adjust the position of the outside damper to maintain the fixed pressure set point.

One way to reduce building HVAC electrical power consumption is by delivering airflow by the VAV system 100 at a fraction of maximum capacity when a lower airflow rate is required to satisfy only a fraction of the maximum space cooling or heating energy demand. This is usually achieved by modulating the fan speed. Centrifugal fans are the most common type of fan used in a VAV system. However, vane-axial fans may also be used. These fans consume energy in proportion to the product of the airflow rate and fan pressure. Therefore, lowering the airflow rate in the VAV system also reduces electrical energy consumption of the system. Typically, the pressure set point for the arbitrary location located downstream from the fan is usually selected so that the fan is able to supply maximum air flow to all of the zones when they are experiencing system design conditions. However, the zones regulated by the terminal units may not experience the design conditions. Typically, the design condition may be exceeded for 2.5% of a season—based upon hours. Consequently, the zones typically require only a fraction of the design condition and this means that the pressure set point is significantly higher than what is required for operation of the building system most of the time. Excessive duct static pressure leads to poor system control, noise, and waste of electrical energy. Hence, there is a need to more effectively determine the pressure set point for controlling the operation of a VAV system of an HVAC system.

The process of installing the components of a HVAC system and initially determining the operational set points is known as commissioning a HVAC system. Because a supply fan typically supplies air to more than one branch 128, the control signal required for proper regulation of a damper does not necessarily correspond to the expected air flow through a terminal unit but rather the actual air flow through a branch. Thus, commissioning may involve measurements of air flows through branches under differing conditions so actual air flows may be used to determine expected air flows for control purposes. The measurements are used to compute flow loss coefficients (K) that correlate the manual flow measurements to the flows measured by a pressure sensor 120 located near a damper 118. The flow loss coefficient may be manually entered into the terminal box controller 116 so the local controller properly regulates air flow to the zone serviced by the branch. The process of measuring air flows and computing the flow loss coefficient is repeated for each branch 128 supplied by a fan 110. If there are errors made during the process of computing the initial flow loss coefficients or system configuration changes made, the process must be repeated for each branch. Furthermore, as the system ages, flow loss coefficients for a branch may change without detection. Only during re-commissioning of the system are such changes detected.

To address the need for simplifying the procedure for computing flow loss coefficients, a system may be used to perform a self-commissioning process. One approach to such a system is described in U.S. Pat. No. 5,705,734 issued Jan. 1, 1998, which is hereby incorporated by reference herein in its entirety. The procedure of the '734 Patent requires a determination of the main supply duct segment flow loss coefficient by measuring fan flow rate at two different terminal unit conditions while holding flow rate through one of the terminal units at a constant rate. Using the flow loss coefficient for the fan supply duct segment and measuring flow and pressure conditions for other terminal unit conditions, the flow loss coefficients for the remaining main duct segments may be computed. Once the flow loss coefficients for the main duct segments are computed, the flow loss coefficient for a terminal unit may be determined by closing all other terminal units and determining the flow through the open terminal unit from the main duct segment flows. This procedure is repeated for each terminal unit. While the method and system of the '734 Patent simplifies the data collection for flow loss coefficient computation, it does rely upon closure of the terminal units other than the one for which the flow loss coefficient is being computed. Terminal unit closure assumes no leakage of air through a closed terminal unit; however, such an assumption is rarely accurate. Also the system and method of the '734 Patent implements a sequential process for determining the flow loss coefficients of duct segments and terminal units.

Another approach for computing flow loss coefficients is described in U.S. Pat. No. 7,024,258 issued Apr. 4, 2006, which is hereby incorporated by reference herein in its entirety. The system of the '258 Patent includes a test vector generator for generating test vectors corresponding to building system test conditions and a building system controller instruction generator for converting the generated test vectors into instructions for operating at least one controller in a building system. The test vector generator generates test vectors using random numbers to control flow rates in terminal units so the resulting model equations are independent. The building system controller instruction generator generates controller instructions that operate the terminal units to achieve the test vectors. The generated instructions may then be provided to the operator of a building system and installed in the controllers of the system. The building system may then be operated in accordance with the instructions and measurements of the resulting pressures and/or flows at the terminal units and fan may be obtained for analysis.

The system of the '258 Patent further includes a flow loss coefficient generator that uses the data collected from measuring the responses of the building system to the generated controller instructions. The flow loss coefficient generator uses a duct layout of the building system, a forcing matrix from the measured pressures, and the independent modeling equations to compute flow loss coefficients for the terminal units. The flow loss coefficients are computed using regression analysis and the independent modeling equations. The computed flow loss coefficients may be used to update the building system model equations. The fan flow rates used for the test conditions may then be used to simulate the response of the updated building system model. The results may then be analyzed to determine whether the computed flow loss coefficients accurately simulate the building system. The flow loss coefficients finally selected may then be used to generate set points and controller instructions for the final model of the building system.

The '258 Patent system is based on the creation of a "One Line Diagram" (e.g., a drawing of a duct layout) which maps the configuration of the duct work with regard to the layout of main ducts, nodes, junction nodes, duct branches and segments, as well as the placement of the terminal units. The "One Line Diagram" creation can come from several different resources, which are mechanical drawings, as-built drawings, Tribal knowledge (un-documented knowledge) or onsite manual mapping of the ducting system. If the mechanical drawings or as-builts are available, and provided that they are reasonably accurate, then the associated cost of developing the "One Line Diagram" may be on the order of $1000, in a best case scenario. In many cases the mechanical and as-builts drawings are either not available or are outdated & no longer accurate because of remodels, resulting in changes to the terminal unit placement and changes to the ducting. In such cases there may be onsite technical personnel that may have detailed knowledge of the ducting systems, and may be able to assist in laying out the ducting configuration for the creation of the "One Line Diagram", however the end result may differ from the actual configuration of duct work, and is subject to the expertise and exacting knowledge of the technical personnel.

Additionally, if none of the above mentioned methods can be used to create the "One Line Diagram", then it can be accomplished by an onsite survey where a technician manually traces out the entire duct-work and then maps it into the "One Line Diagram", however this methodology will generally be cost-prohibitive on larger systems, because the upfront development costs outweigh the return on investment (ROI).

The following describes examples of further approaches for computing friction loss flow coefficients for terminal units, which avoids the need to use/create the described "One Line Diagram", and thus may be relatively more cost effective to carry out for systems where a "One Line Diagram" is not available and/or is not cost effective to produce. This described approach may provide significant cost reductions in the deployment of a VAV solution and enable it to be practical for the light commercial market space with air handling units in the 10 to 25 horsepower range.

A first example may involve approximating duct static pressure for terminal units 122 by carrying out a configuration procedure. As discussed previously, such a terminal unit includes an associated electronically controlled damper actuator 118 that is controlled by a terminal box controller 116. The terminal box controller, for example, may be included by the terminal unit, may be mounted to the terminal unit, and/or may be mounted sufficiently close to an associated terminal unit to control the damper 118 and receive measurements from the pressure sensor 120 (e.g., used to measure flow rates) associated with the terminal unit. An example of a terminal box controller includes the Siemens 540-100 and 540-200 models of VAV TEC terminal box controllers, produced by Siemens Industry, Inc.

The configuration procedure may include placing/using a duct static pressure sensor (e.g., a differential pressure sensor) near a discharge of the supply fan 110, but prior to any duct branches, duct segments and terminal units, but at a distance far enough away from the fan to allow for stable static pressure readings to be measured (i.e., laminar flow measurements vs. turbulent flow measurements). If it is not possible/practical to place the static pressure sensor far enough downstream, then a dampening chamber may be used to eliminate air pulsations from the fan.

Next the configuration procedure may include exercising the system (through a set of test vectors), which would place the terminal unit dampers of the system at various positions and then record and store the results data. The test vector set may include six or more test vectors defined for each of 5 fan speeds (e.g., 30, 40, 50, 60, 70 CPM) for a total of 30 or more test vectors. A first test vector, for example, may correspond to placing half of the dampers in an open position and the other half in a closed position. A second vector may be the inverse (closing the open dampers and opening the closed dampers of the first test vector). Further test vectors may be chosen in which different dampers are configured at other closed, opened, or partially opened positions.

It should be appreciated that no diagram of the duct work is being used. Thus, the selection of which dampers are the dampers that are chosen to be closed or opened for the first test vector may be randomly chosen, and or chosen based on any other scheme (e.g., based on the network identifiers associated with each terminal box controller).

An additional test vector for operating the fan speed at 50% of its maximum output rate, while all of the terminal units are commanded open, may also be added to the test vector set. Alternative embodiments may use a smaller or larger number of test vectors and fan speeds depending on the complexity of the duct layout in order to calculate the approximate friction loss coefficients.

In an example embodiment, at least one processor in at least one controller 116, 130, workstation, server, PC, tablet, mobile phone, or other data processing system 132 may be configured with a software and/or firmware application that is programmed to generate instructions that cause the configuration procedure to be carried out according to the test vector set. These instructions, for example, cause the system to operate at different combinations of a plurality of different fan speeds for at least one supply fan 110 for a plurality of different damper opening configurations of dampers 118. Such instructions, for example, may be included in a test program that is written in PPCL, which is a programming language for fan controllers and for terminal box controllers that communicate on an Insight network. In alternative embodiments, a test program for carrying out the test vector set may be implemented in other controller languages depending on the type of building automation network and controllers used by the building ventilation system 100.

Figure 2:
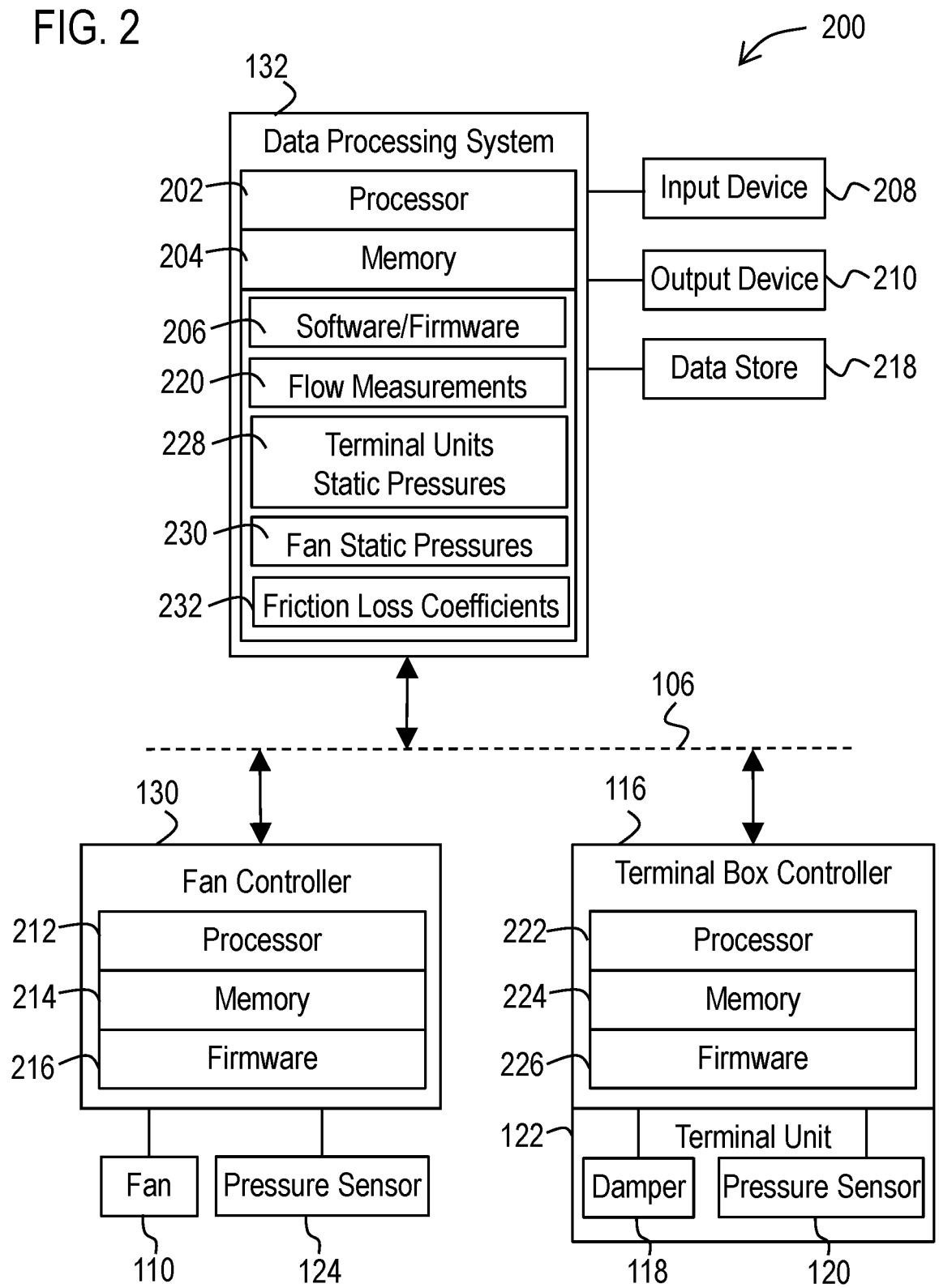
FIG. 2 illustrates a functional block diagram of an example control system that facilitates controlling building fluid distribution in the building ventilation system.

With reference to FIG. 2, a block diagram of an example control system 200 is illustrated that facilitates carrying out this described example. The control system 200 may include one or more processor 202, 212, 222 (e.g., a microprocessor/CPU) located in the previously described terminal box controller 116, fan controller 130, and/or another controller/data processing system 132, that is operated by a user to cause the control system 200 to carry out the described example embodiments. These described processors may be configured to communicate with each other via one or more building automation communication protocols and networks 106 (e.g., BACnet/IP, BACnet/MSTP, Floor Level Network).

In example embodiments, these described processors may be configured to carry out various processes and functions described herein by executing from respective memories 204, 214, 224 executable instructions 206, 216, 226 (such as software/firmware instructions) corresponding to one or more building automation applications or portions thereof that are programmed to cause the respective processor to carry out the various processes and functions described herein. Such memories 204, 214, 224 may correspond to an internal or external volatile memory (e.g., main memory, CPU cache, and/or RAM), that is included in the processor and/or in operative connection with the processor. Such memories may also correspond to a nonvolatile memory (e.g., flash memory, SSD, hard drive, or other storage device or non-transitory computer readable media) in operative connection with the processor.

The described control system 200 may include at least one input device 208 and at least one display device 210 in operative connection with at least one of the processors. The input device, for example, may include buttons, a mouse, keyboard, touch screen, or other type of input device capable of providing user inputs to the processor. The display device, for example, may include an LCD or AMOLED display screen, monitor, or any other type of display device capable of displaying outputs from the processor.

The control system 200 may also include one or more data stores 218. During the exercising of the system flow measurements acquired at each ventilation duct branch may be recorded and stored in the data store 218. Examples of a data store may include a file and/or record stored in a database (e.g., Oracle, Microsoft SQL Server), file system, hard drive, SSD, flash memory, memory card and/or any other type of device or system that stores non-volatile data. One of the processors 202, 212, 222, for example, may be configured to manage, retrieve, generate, use, revise, and store data and/or other information described herein from/in the data store 218.

In one approach, the at least one processor that controls and causes the configuration procedure to be carried out may be the fan controller 130. However, in another embodiment, the at least one processor may correspond to a processor in a workstation or other data processing system 132. In addition, in another embodiment, the at least one processor may correspond to a processor in one or more of the terminal box controllers 116. Further, in other example embodiments, the at least one processor that controls and causes the configuration procedure to be carried out may include any combination of two or more of these different processors that cause instructions (e.g., PPCL) to be communicated to the fan controller 130 and the terminal box controllers to carry out this described configuration procedure.

For each different combination of fan speed and damper opening configuration, the at least one processor may cause a number of different measurements to be determined by the at least one processor. These measurements include determining a static pressure measurement 228 for each terminal unit based at least in part on at least one flow measurement 220 determined by each terminal box controller using a pressure sensor 120 (also referred to as an airflow sensor) at each terminal unit. In addition, such measurements may include determining a static pressure measurement 230 for the supply fan from a pressure sensor 124 (e.g., a differential static pressure sensor) mounted in a ventilation duct downstream of the at least one supply fan 110 and upstream of each terminal unit (i.e., upstream each damper 118 controlled via a terminal box controller 116). As discussed previously, such measurements may be stored in one or more data stores as the configuration procedure is being carried out.

Once the static pressure 228 is known at each terminal unit over a wide range of test vectors (i.e., combinations of fan speed and damper positions) and by knowing the recorded static pressure measurements 230 measured at the discharge of the fan, then friction loss coefficient(s) (K) 232 can be determined for each terminal box controller. Such determined friction loss coefficients may include an average friction loss coefficient, as well as the highest and lowest friction loss coefficients. For example, the approximate average friction loss coefficient for a terminal box controller may be calculated by subtracting an average of the determined static pressures 228 for the ventilation duct branches from an average of the corresponding measured static pressures 230 for the fan.

In addition, the at least one processor may be configured to store each respective determined friction loss coefficient (or set thereof) in a memory 224 in each respective terminal box controller 116 for use by each respective terminal box controller in controlling the damper opening configurations. For example, the at least one processor may communicate instructions including a newly determined set of friction loss coefficients (avg., high, and low) to each terminal box controller to cause the terminal box controller to store and configure the terminal box controller to use the newly calculated friction loss coefficients. Such stored friction loss coefficients may be used, for example, by the terminal box controller to calibrate the measurements of airflow which are used by the terminal box controller to control the damper.

In an example embodiment, the flow measurements collected from the terminal box controllers (in order to determine static pressure) may include airflow rates (in CFM or LPS) for the air moving through each terminal box for each different test vector. The at least one processor (e.g., in the fan controller 130, data processing system 132, or one of the terminal box controllers 116) may then be configured to calculate (e.g., using Bernouli's equation or other fluid dynamic equations) the static pressure measurements for the terminal box controller based at least in part on the received airflow rates and cross-sectional area measurements associated with a ventilation duct for each terminal unit. If the cross-sectional area measurements of the duct (e.g., where the pressure sensors are located) are not already available to the at least one processor, the at least one processor may acquire such data by requesting the cross-sectional area measurements (e.g., duct area in square feet or square meters) from the terminal box controllers.

For example, the processor 222 of each terminal box controller may be configured to receive a technician provided "field parameter" of duct cross-sectional area and use the received duct cross-sectional area value and the measured static pressure to calculate the airflow rate (e.g., in units of volume per time such as CFM or LPS). Such a calculated airflow rate and the cross-sectional area may be made accessible to the least one processor for use with calculating static pressure by the at least one processor.

In an alternative embodiment, rather than having the static pressure for each terminal box controller be calculated external to the terminal box controller (e.g., via the fan controller 130, data processing system 132, or one of the terminal boxes), the firmware 226 of the terminal box controllers (such as for Siemens VAV TEC controllers) may be programmed to enable static pressure determined using the pressure sensor 120 of the ventilation duct branch to be accessible by external devices. Thus, the fan controller 130 or data processing system 132 or one of the terminal box controllers may then be configured to request the determined static pressure measurements directly from the terminal box controllers.

For example, the pressure sensor in each ventilation duct branch 128 may correspond to a differential pressure sensor having a pitot tube and/or pitot tube array that is measured using a pressure bridge component. The pressure bridge may determine the static pressure and the total pressure (static plus velocity pressure) and then via the processor 222, plug these values into a formula (e.g., that subtracts the static pressure from the total pressure) to arrive at velocity pressure. The calculated velocity pressure and stored cross-sectional area of the duct, may be used by the processor in calculating the previously described airflow rate through the duct branch.

However, in this alternative example, rather than determining static pressure using the airflow rate measurements, the terminal box controllers may be configured to additionally enable internally determined values of static pressure, total pressure and/or velocity pressure to be directly communicated to external devices (such as the least one processor) as data points. When these values are exposed in this manner, they may be read, trended, recorded and stored as any other BAS data points in a BAS system. The at least one processor may use these directly acquired static pressure measurements from the terminal box controllers to determine the friction loss coefficients as in the previously described example.

This alternative example may provide relatively more accurate static pressure measurements for each terminal box controller compared to the first described example, in which the static pressure measurements are calculated from the provided airflow rates and duct area values associated with a terminal box controller.

Figure 3:
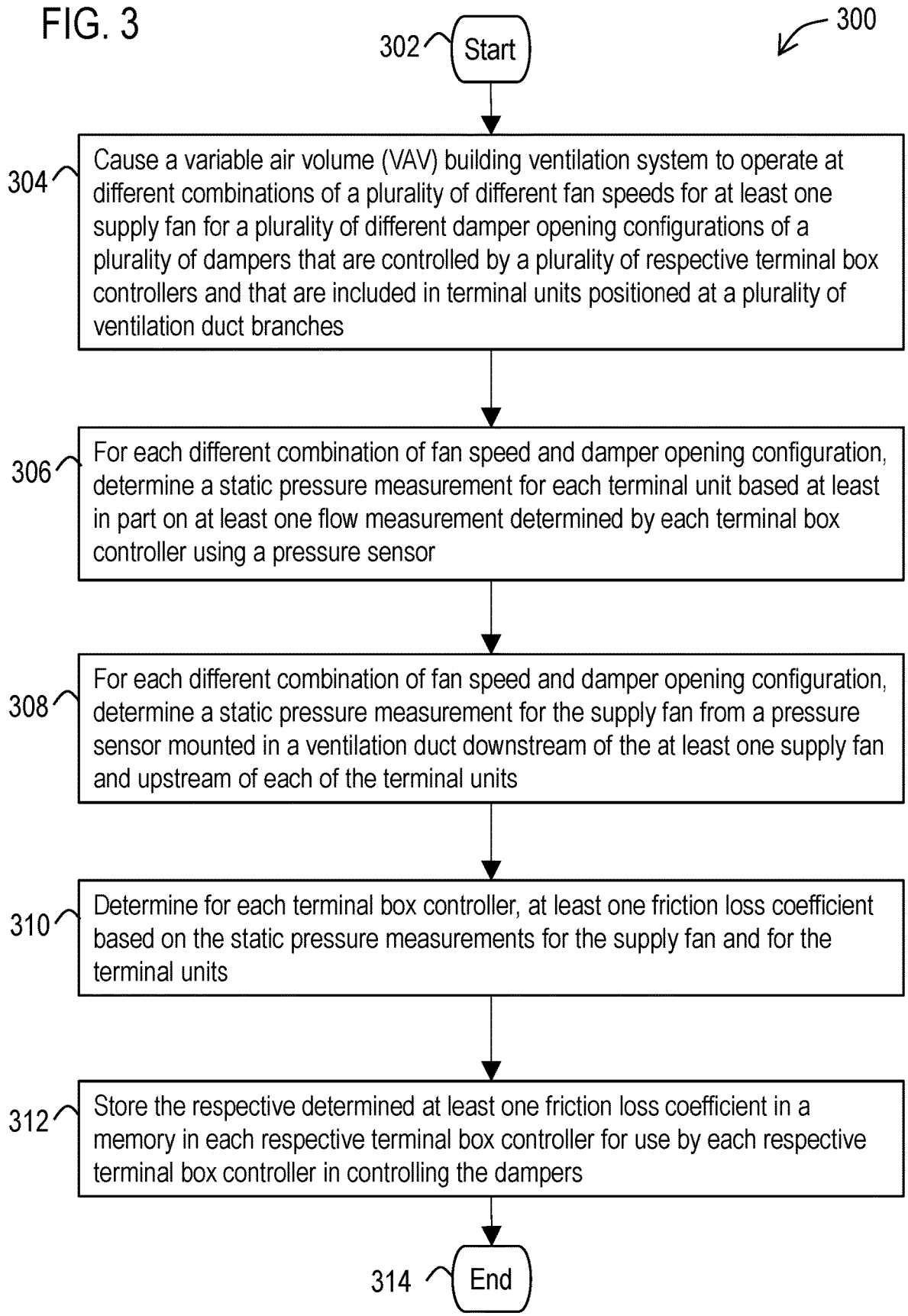
FIG. 3 illustrates a flow diagram of an example methodology that facilitates controlling building fluid distribution in a building ventilation system.

Referring now to FIG. 3, a methodology 300 is illustrated that facilitates controlling building fluid distribution. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at 302 and may include several acts carried out through operation of at least one processor. These acts may include an act 304 of causing a variable air volume (VAV) building ventilation system to operate at different combinations of a plurality of different fan speeds for at least one supply fan for a plurality of different damper opening configurations of a plurality of dampers that are controlled by a plurality of respective terminal box controllers and that are included in terminal units positioned at a plurality of ventilation duct branches.

For each different combination of fan speed and damper opening configuration, the methodology 300 may include an act 306 of determining a static pressure measurement for each terminal unit based at least in part on at least one flow measurement determined by each terminal box controller using a pressure sensor. In addition, for each different combination of fan speed and damper opening configuration, the methodology 300 may include an act 308 of determining a static pressure measurement for the supply fan from a pressure sensor mounted in a ventilation duct downstream of the at least one supply fan and upstream of each of the terminal units.

In addition, the methodology 300 may include an act 310 of determining for each terminal box controller, at least one friction loss coefficient based on the static pressure measurements for the supply fan and for the terminal units. Further, the methodology 300 may include an act 312 storing the respective determined at least one friction loss coefficient in a memory in each respective terminal box controller for use by each respective terminal box controller in controlling the dampers.

Also, it should be appreciated that this described methodology may include additional acts and/or alternative acts corresponding to the features described previously with respect to the data control system 200.

For example, the at least one processor may include at least one first processor that is external to all of the terminal box controllers. The methodology may include an act of through operation of the at least one first processor: requesting the flow measurements from the terminal box controllers and calculating the friction loss coefficients therefrom. Here, the at least one first processor may include a fan controller, a data processing system that communicates with the fan controller, or a combination thereof.

In another example, the at least one processor may include a first processor of a first one of the terminal box controllers. The methodology may include an act of through operation of the first processor: determining flow measurements for a first terminal unit; receiving static pressure measurements for the supply fan; and determining at least one first friction loss coefficient for the first terminal box controller, based on the received static pressure measurements for the supply fan and the determined static pressure measurements for the first terminal unit.

In this described example, the methodology may include an act of through operation of the at least one first processor: controlling the supply fan to have the plurality of different fan speeds; communicating with at least one other terminal box controller to set the damper opening configurations controlled by the at least one other terminal box controller; requesting the flow measurements from the at least one other terminal box controller; determining at least one second friction loss coefficient for the at least one other terminal box controller; and communicating the determined at least one second friction loss coefficient to the at least one other terminal box controller.

In addition, for at least one combination of supply fan speed and damper configurations, the methodology may include an act of selecting the dampers at random to be in open and closed positions.

Also, in an example embodiment of the methodology, the flow measurements may include airflow rate in units of volume per time. The static pressure measurements for the terminal units may be determined based at least in part on the received airflow rates and cross-sectional area measurements associated with each terminal box controller.

Also, in an alternative example embodiment, at least one terminal box controller may communicate flow measurements including static pressure, total pressure, and/or velocity pressure to the at least one processor.

As discussed previously, acts associated with the above-described methodologies (other than any described manual acts) may be carried out by one or more processors 202, 212, 222. Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination of the processor with the software/firmware instructions loaded/installed into the described memory (volatile and/or non-volatile), which are currently being executed and/or are available to be executed by the processor to cause the processor to carry out the described/claimed process or function. Thus, a processor that is powered off or is executing other software, but has the described software instructions installed on a storage device in operative connection therewith (such as flash drive or SSD) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C #, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 4:
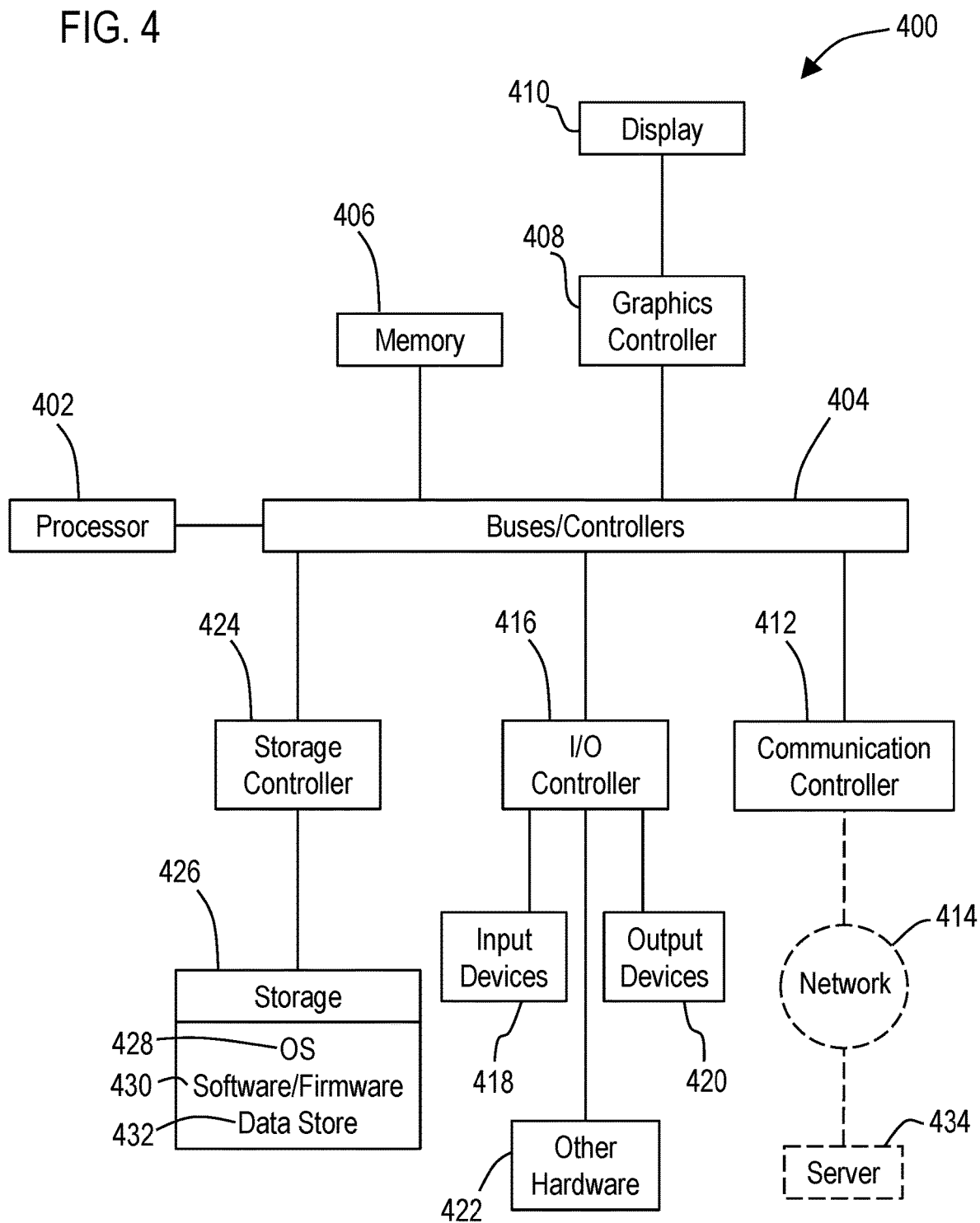
FIG. 4 illustrates a block diagram of a data processing system in which an embodiment may be implemented.

FIG. 4 illustrates a block diagram of a data processing system 400 (e.g., a computer system) in which an embodiment can be implemented, such as the previously described data processing system 132, and/or other system operatively configured by computer/processor executable instructions, circuits, or otherwise to perform the functions and processes as described herein. The data processing system depicted includes at least one processor 402 (e.g., a CPU) that may be connected to one or more bridges/controllers/buses 404 (e.g., a north bridge, a south bridge). One of the buses 404, for example, may include one or more I/O buses such as a PCI Express bus. Also connected to various buses in the depicted example may include a main memory 406 (RAM) and a graphics controller 408. The graphics controller 408 may be connected to one or more display devices 410 (e.g., LCD or AMOLED display screen, monitor, VR headset, and/or projector). It should also be noted that the processor 402 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 412 (Ethernet controllers, WiFi controllers, cellular controllers) operative to connect to a local area network (LAN), Wide Area Network (WAN), a cellular network, and/or other wired or wireless networks 414 or communication equipment.

Further components connected to various busses may include one or more I/O controllers 416 such as USB controllers, Bluetooth controllers, and/or dedicated audio controllers (connected to speakers and/or microphones). It should also be appreciated that various peripherals may be connected to the I/O controller(s) (via various ports and connections) including input devices 418 (e.g., keyboard, mouse, pointer, touch screen, touch pad, drawing tablet, trackball, buttons, keypad, game controller, gamepad, camera, microphone, scanners, motion sensing devices that capture motion gestures), output devices 420 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 402 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 422 connected to the I/O controllers 416 may include any type of device, machine, or component that is configured to communicate with a data processing system.

Additional components connected to various busses may include one or more storage controllers 424 (e.g., SATA). A storage controller may be connected to a storage device 426 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 404 such as a PCI Express bus.

A data processing system in accordance with an embodiment of the present disclosure may include an operating system 428, software/firmware 430, and data stores 432 (that may be stored on a storage device 426 and/or the memory 406). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 412 may be connected to the network 414 (which may or may not be a part of a data processing system 400), which can be any local, wide area, remote, private, and/or public data processing system network or combination of networks, as known to those of skill in the art, including the Internet. Data processing system 400 can communicate over the network 414 with one or more other data processing systems such as a server 434 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 402 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 400 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 400 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for controlling building fluid distribution comprising:
    at least one processor configured via executable instructions included in at least one memory to:
        cause a variable air volume (VAV) building ventilation system to operate at different combinations of a plurality of different fan speeds for at least one supply fan for a plurality of different damper opening configurations of a plurality of dampers that are controlled by a plurality of respective terminal box controllers and that are included in terminal units positioned at a plurality of ventilation duct branches;
        for each different combination of fan speed and damper opening configuration:
            determine a static pressure measurement for each terminal unit based at least in part on at least one flow measurement determined by each terminal box controller using a pressure sensor; and
            determine a static pressure measurement for the supply fan from a pressure sensor mounted in a ventilation duct downstream of the at least one supply fan and upstream of each of the terminal units;
        determine for each terminal box controller, at least one friction loss coefficient based on the static pressure measurements for the supply fan and for the terminal units; and
        store the respective determined at least one friction loss coefficient in a memory in each respective terminal box controller for use by each respective terminal box controller in controlling the dampers.

2. The system according to claim 1, wherein the at least one processor includes at least one first processor that is external to all of the terminal box controllers, wherein the at least one first processor is configured to request the flow measurements from the terminal box controllers and determine the friction loss coefficients therefrom, wherein the at least one first processor includes a fan controller, a data processing system that communicates with the fan controller, or a combination thereof.

3. The system according to claim 1, wherein the at least one processor includes a first processor of a first one of the terminal box controllers that determines flow measurements for a first terminal unit, wherein the at least one first processor is configured to receive static pressure measurements for the supply fan and determine at least one first friction loss coefficient for the first terminal box controller, based on the received static pressure measurements for the supply fan and the determined static pressure measurements for the first terminal unit.

4. The system according to claim 3, wherein the at least one first processor is configured to:
control the supply fan to have the plurality of different fan speeds; communicate with at least one other terminal box controller to set the damper opening configurations controlled by the at least one other terminal box controller; request the flow measurements from the at least one other terminal box controller; determine at least one second friction loss coefficient for the at least one other terminal box controller; and communicate the determined at least one second friction loss coefficient to the at least one other terminal box controller.

5. The system according to claim 1, wherein for at least one combination of supply fan speed and damper configurations, the dampers are selected at random to be in open and closed positions.

6. The system according to claim 1, wherein the flow measurements include airflow rate in units of volume per time, wherein the static pressure measurements for the terminal units are determined based at least in part on the received airflow rates and cross-sectional area measurements stored in each terminal box controller.

7. The system according to claim 1, wherein the flow measurements include static pressure, total pressure, and velocity pressure that are communicated from at least one terminal box controller to the at least one processor.

8. A method for controlling building fluid distribution comprising:
through operation of at least one processor:
causing a variable air volume (VAV) building ventilation system to operate at different combinations of a plurality of different fan speeds for at least one supply fan for a plurality of different damper opening configurations of a plurality of dampers that are controlled by a plurality of respective terminal box controllers and that are included in terminal units positioned at a plurality of ventilation duct branches;
for each different combination of fan speed and damper opening configuration:
determining a static pressure measurement for each terminal unit based at least in part on at least one flow measurement determined by each terminal box controller using a pressure sensor; and
determining a static pressure measurement for the supply fan from a pressure sensor mounted in a ventilation duct downstream of the at least one supply fan and upstream of each of the terminal units;
determining for each terminal box controller, at least one friction loss coefficient based on the static pressure measurements for the supply fan and for the terminal units; and
storing the respective determined at least one friction loss coefficient in a memory in each respective terminal box controller for use by each respective terminal box controller in controlling the dampers.

9. The method according to claim 8, wherein the at least one processor includes at least one first processor that is external to all of the terminal box controllers, further comprising through operation of the at least one first processor: requesting the flow measurements from the terminal box controllers and determine the friction loss coefficients therefrom, wherein the at least one first processor includes a fan controller, a data processing system that communicates with the fan controller, or a combination thereof.

10. The method according to claim 8, wherein the at least one processor includes a first processor of a first one of the terminal box controllers, further comprising through operation of the first processor: determining flow measurements for a first terminal unit; receiving static pressure measurements for the supply fan; and determining at least one first friction loss coefficient for the first terminal box controller, based on the received static pressure measurements for the supply fan and the determined static pressure measurements for the first terminal unit.

11. The method according to claim 10, further comprising through operation of the at least one first processor: controlling the supply fan to have the plurality of different fan speeds; communicating with at least one other terminal box controller to set the damper opening configurations controlled by the at least one other terminal box controller; requesting the flow measurements from the at least one other terminal box controller; determining at least one second friction loss coefficient for the at least one other terminal box controller; and communicating the determined at least one second friction loss coefficient to the at least one other terminal box controller.

12. The method according to claim 8, wherein for at least one combination of supply fan speed and damper configurations, further comprising selecting the dampers at random to be in open and closed positions.

13. The method system according to claim 8, wherein the flow measurements include airflow rate in units of volume per time, wherein the static pressure measurements for the terminal units are determined based at least in part on the received airflow rates and cross-sectional area measurements associated with each terminal box controller.

14. The method according to claim 8, further comprising at least one terminal box controller communicating flow measurements including static pressure, total pressure, and/or velocity pressure to the at least one processor.

15. A non-transitory computer readable medium encoded with processor executable instructions that when executed by at least one processor, cause the at least one processor to carry out a method for controlling building fluid distribution according to claim 8.

* * * * *